Figure 1:
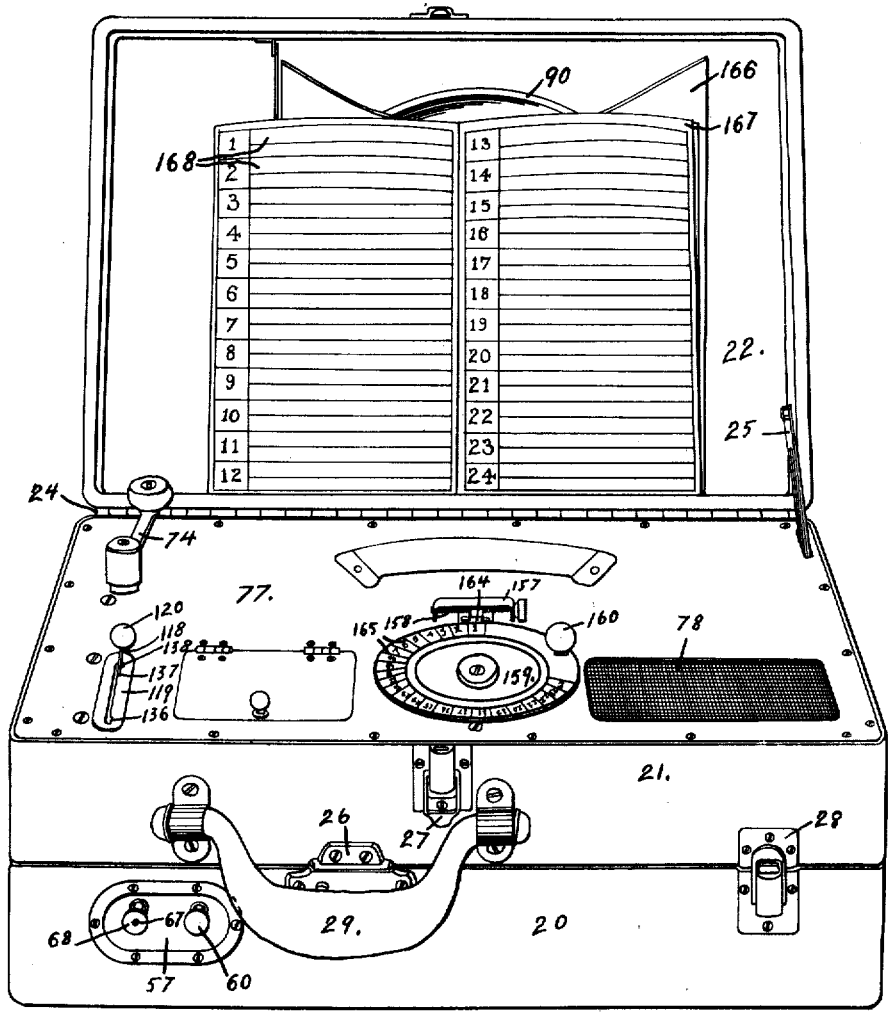

Oct. 10, 1933.  A. L. RUNYAN  1,930,286
EDUCATIONAL APPARATUS
Original Filed Nov. 7, 1930   6 Sheets-Sheet 1

ARTHUR L. RUNYAN, INVENTOR

BY David O. Barnell.
ATTORNEY

Oct. 10, 1933.  A. L. RUNYAN  1,930,286
EDUCATIONAL APPARATUS
Original Filed Nov. 7, 1930   6 Sheets-Sheet 2

ARTHUR L. RUNYAN.

Oct. 10, 1933.   A. L. RUNYAN   1,930,286
EDUCATIONAL APPARATUS
Original Filed Nov. 7, 1930   6 Sheets-Sheet 3
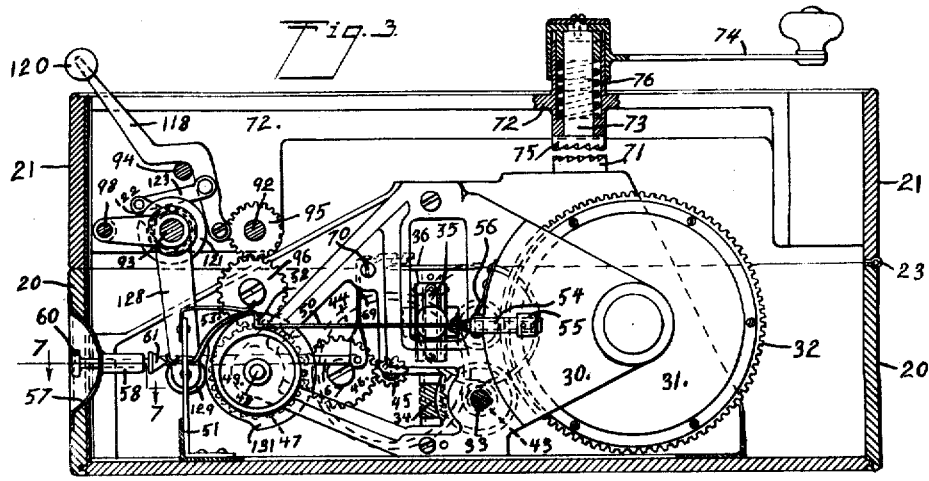
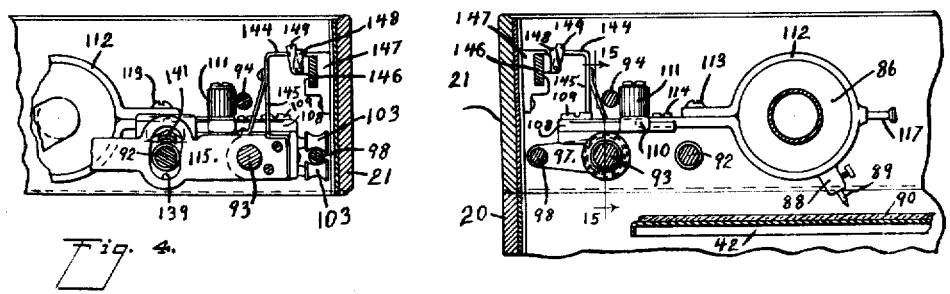
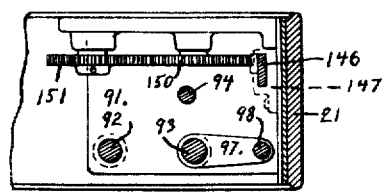
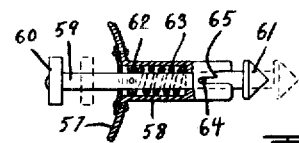
Inventor
ARTHUR L. RUNYAN.
By David O. Barnell
Attorney Oct. 10, 1933.  A. L. RUNYAN  1,930,286
EDUCATIONAL APPARATUS
Original Filed Nov. 7, 1930  6 Sheets-Sheet 4
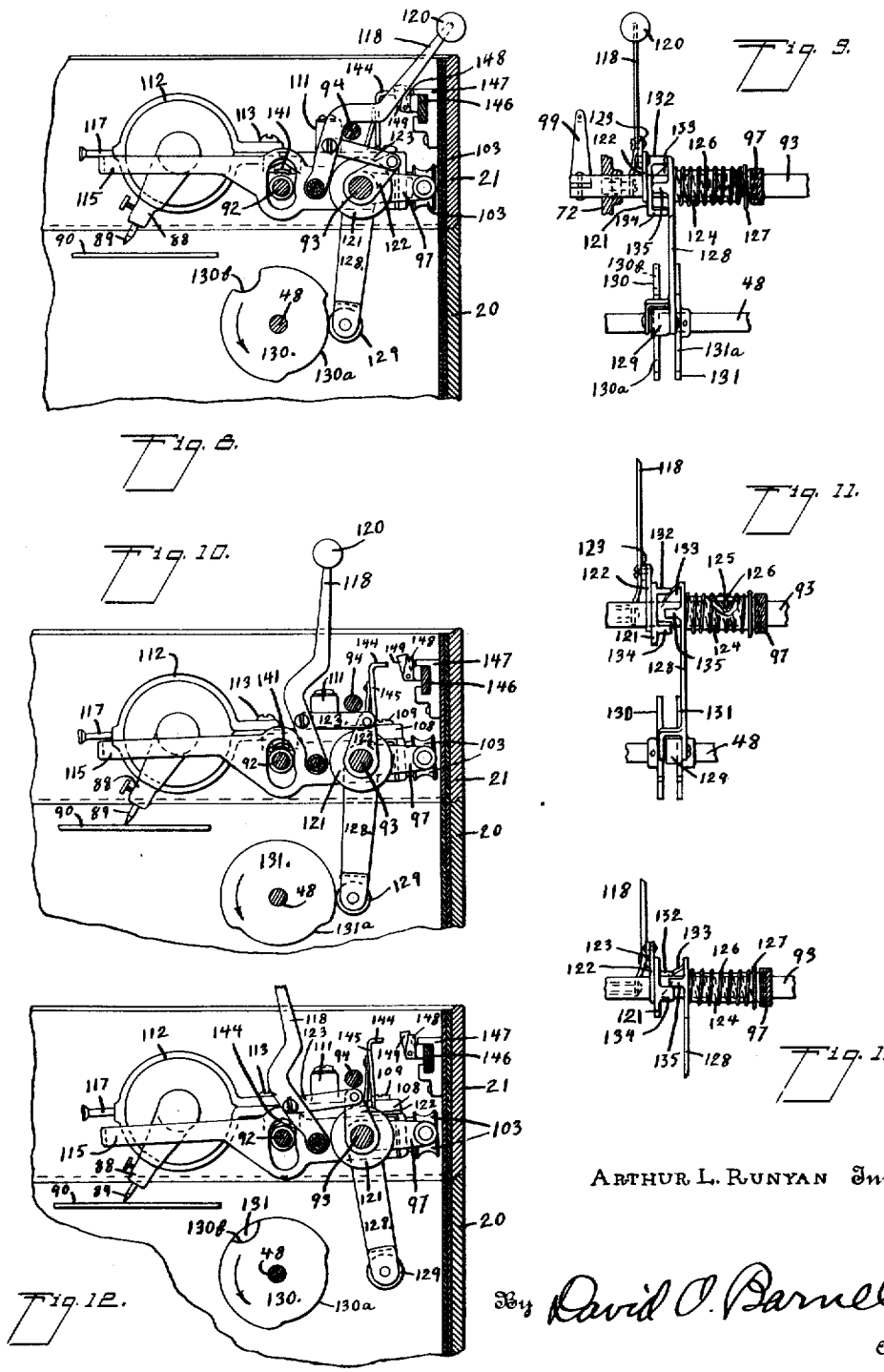
ARTHUR L. RUNYAN Inventor
By David O. Barnell.
Attorney Oct. 10, 1933.  A. L. RUNYAN  1,930,286
EDUCATIONAL APPARATUS
Original Filed Nov. 7, 1930   6 Sheets-Sheet 5
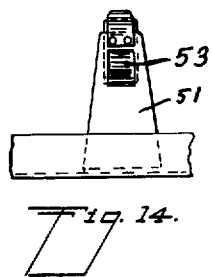
Fig. 14.
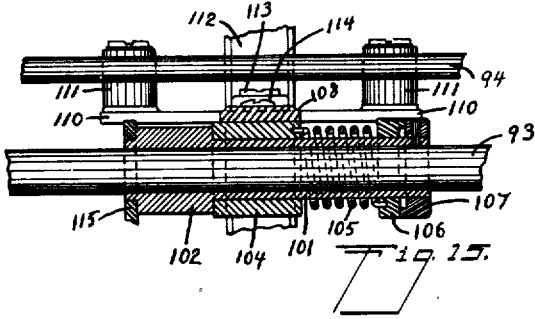
Fig. 15.
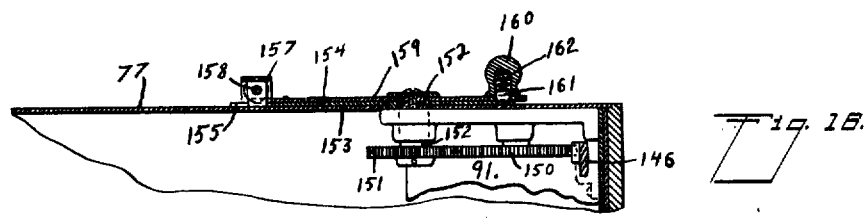
Fig. 16.
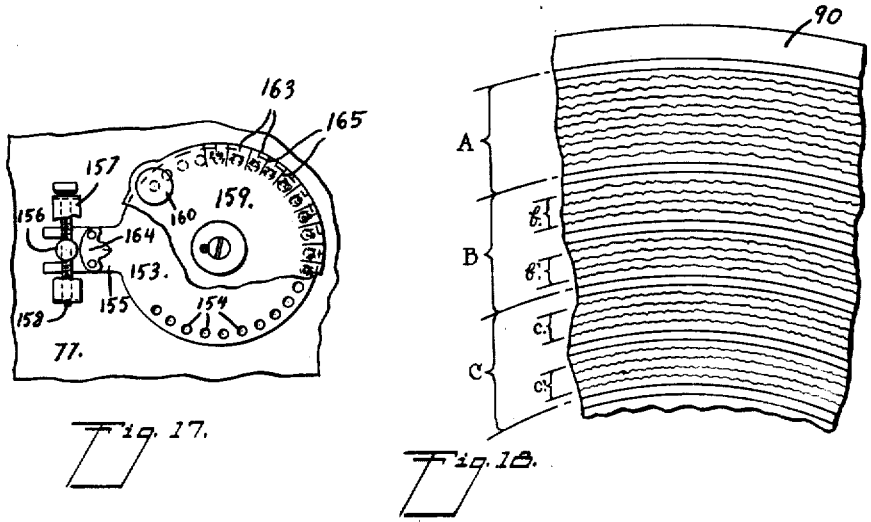
Fig. 17.
Fig. 18.
ARTHUR L. RUNYAN. Inventor
By David O. Barnell.
Attorney Oct. 10, 1933.　　　A. L. RUNYAN　　　1,930,286
EDUCATIONAL APPARATUS
Original Filed Nov. 7, 1930　　6 Sheets-Sheet 6
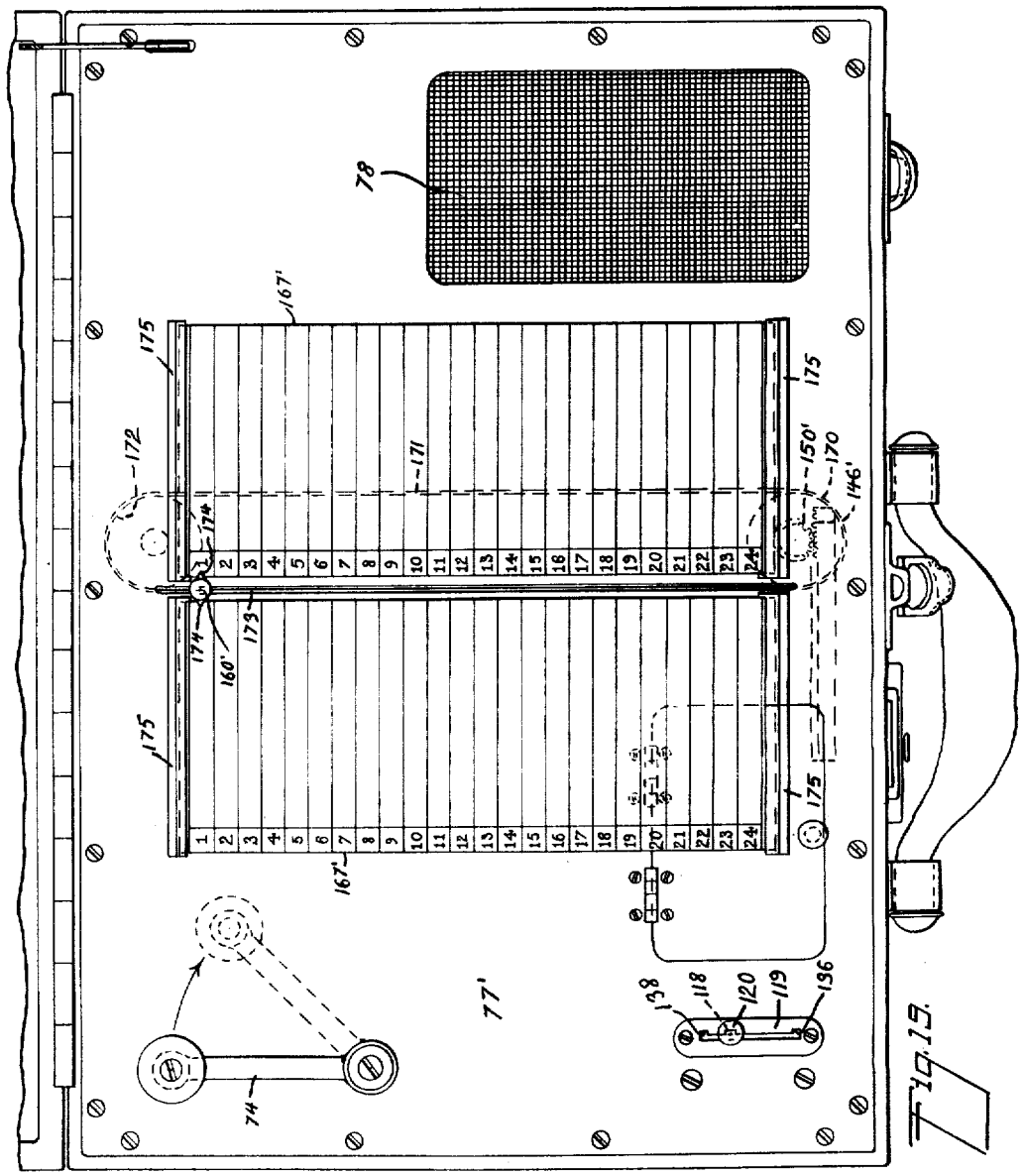
ARTHUR L. RUNYAN. INVENTOR
BY David O. Barnell
ATTORNEY Patented Oct. 10, 1933

1,930,286

UNITED STATES PATENT OFFICE 1,930,286

EDUCATIONAL APPARATUS

Arthur L. Runyan, Chicago, Ill., assignor to Talk-A-Print, trust, and Arthur L. Runyan, trustee Application November 7, 1930, Serial No. 493,954
Renewed March 7, 1933

10 Claims. (Cl. 35—12)

My invention relates to educational apparatus, particularly to apparatus designed to facilitate the study of subjects requiring auditory perception, such as language, music, telegraphic code reception and the like. It is the object of my present invention to provide a mechanism suitable for uses similar to that of the selective sound reproducing mechanism disclosed in Letters Patent No. 1,655,510, issued to me Jan. 10, 1928, eliminating therefrom the printing or character-reproducing mechanism, and providing improved and simplified controlling means therefor. More particular objects of my present invention are to provide a numerical index for the selection of the various divisions of the sound-record for reproduction, to provide selecting mechanism which may be used for record-subdivisions of different length, to provide means for effecting automatic repetition of the reproduction of short subdivisions of the sound-record, to provide manually-controlled means for effecting repetition of the reproduction of any selected division of the sound-record, and to provide means for effecting continuous reproduction of the entire sound-record, when desired. A further object of my invention is to provide means by which the sound-reproducer is disconnected from the selecting mechanism during the operation of said reproducer, whereby to avoid injury to the sound-records by attempted operation of the selecting means during such times as the reproducer-stylus is engaged with the record. Further objects of my invention relate to the specific mechanical and structural details of the mechanism, and will be more fully set forth hereinafter.

Figure 2:
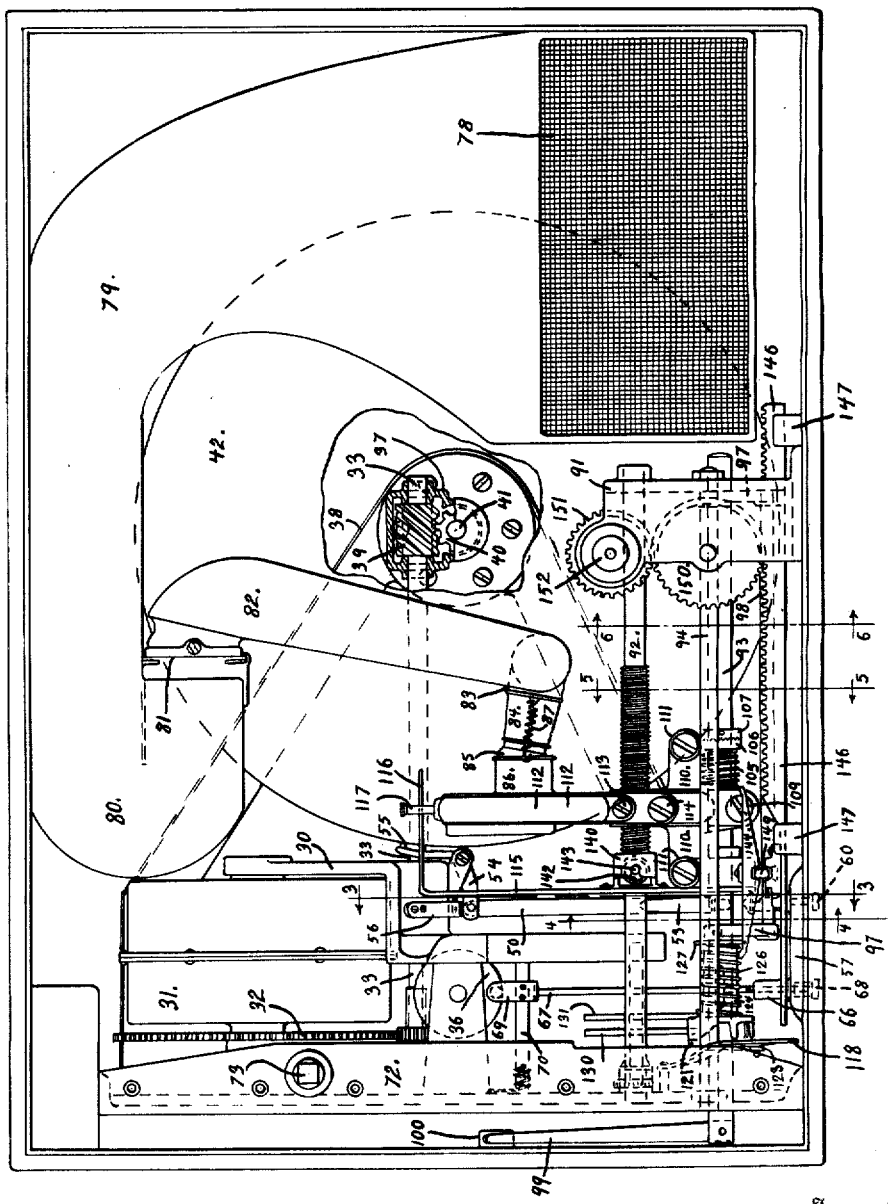

In the accompanying drawings, Fig. 1 is a perspective view of a mechanism embodying my invention, Fig. 2 is a plan view of the operating parts as disclosed by removal of the cover-plate of the main casing, and having portions broken away to show the drive-gearing for the turntable, Fig. 3 is a vertical section on the line 3—3 of Fig. 2, Fig. 4 is a detail vertical section on the line 4—4 of Fig. 2, Fig. 5 is a detail vertical section on the line 5—5 of Fig. 2, Fig. 6 is a detail vertical section on the line 6—6 of Fig. 2, Fig. 7 is a detail horizontal section on the line 7—7 of Fig. 3, Fig. 8 is a diagrammatic side view of the reproducer control mechanism in position for automatic repetition of short subdivisions of the sound-record, Fig. 9 is a detail front view of portions of said control mechanism in the same position as in Fig. 8, Fig. 10 is a side view of said control mechanism in position for single reproduction of a normal division of the sound-record, Fig. 11 is a front view of portions of said control mechanism in the same position as in Fig. 10, Fig. 12 is a side view showing said control mechanism in position for continuous reproduction of an entire sound-record, Fig. 13 is a front view of portions of said control mechanism in the same position shown in Fig. 12, Fig. 14 is a detail front view of the stop-control arm and its guide, Fig. 15 is a longitudinal section of the reproducer-carriage on the line 15—15 of Fig. 5, Fig. 16 is a detail axial section of the selector-disk, Fig. 17 is a detail plan view of the selector-disk with portions broken away to show the underlying adjuster-plate, Fig. 18 is an enlarged detail of a portion of a sound-record suitable for use with the selective sound-reproducing devices, and Fig. 19 is a plan view of the main casing, showing a modified form for the selector-index and actuating means.

In carrying out my invention according to the illustrated embodiment thereof, I provide a casing consisting of a bottom section 20, an intermediate section 21 and a cover section 22 the sections 20 and 21 being connected by a hinge 23 at the rear side thereof, and sections 21 and 22 being similarly connected by a hinge 24. The cover section 22 is adapted to be raised to a position at which it is slightly inclined rearwardly, as shown in Fig. 1, and is retained releasably in said raised position by means of a slotted brace-bar 25. At the front sides of the casing sections suitable fastening means 26, 27 and 28 are provided, for holding the sections in closed relation, and a handle 29 is provided on the intermediate section 21 for convenience in carrying the closed casing.

Within the bottom section 20 of the casing, adjacent to one end thereof is fixedly secured the frame 30 of a spring-motor, said motor having a spring-drum 31 carrying a main gear 32, which is connected through a suitable gear-train with a horizontal drive-shaft 33, the latter being connected by a worm-wheel and a worm 34 with a vertical governor-shaft carrying a centrifugal governing device 35 controlling a governor friction-plate 36. The horizontal drive-shaft 33 is extended longitudinally of the casing to approximately the center thereof, where it enters a gear-housing 37 mounted on a V-shaped extension 38 of the motor-frame. On the drive-shaft within the housing 37 is secured a spiral gear 39 which meshes operatively with a similar gear 40 carried by the vertical turntable-shaft 41, said shaft having the turntable 42 mounted on the upper portion thereof which projects from the housing. Through the medium of a reducing gear-train 43, 44, 45, 46 and 47, indicated in Fig. 3, the shaft 33 is operatively connected with a horizontally extending control-shaft 48 which is mounted in the frame 30 near the front end thereof, the ratio of the gear-train being such that the shaft 33 will make a plurality of revolutions, fifteen for example, to each revolution of said control-shaft 48.

Upon the shaft 48 is secured the stop-cam 49 of which the periphery is spirally shaped and has a single radial offset or shoulder connecting the ends of the spiral portions, as shown in Fig. 3. An arm 50 extends over the top of the cam 49, curving downwardly about the front side thereof and passing through a slot in a vertical guide 51. An offset 52 in said arm 50 is normally engaged by the shoulder of the cam, the arm being pressed downwardly into engagement with the cam by means of a flat spring 53 secured to the upper end of the guide 51. The rear end of said arm 50 is connected with the transverse arm of an L-shaped brake-lever 54 which is fulcrumed on the frame 30, the other or rearwardly extending arm of said lever carrying a brake-shoe 55 adapted to frictionally engage the edge of the turntable 42. A flat spring 56 engages the transverse arm of the brake-lever and tends to move the lever to brake-releasing position. In the front of the casing-section 20 adjacent to the control-shaft there is inserted a dished plate 57 carrying a rearwardly extending guide 58 in which is held slidably the trip-rod 59. Said rod has secured thereon a flat head 60 at the front end thereof, a conical head 61 at the rear end thereof, and an intermediate collar 62 which is engaged by a coil spring 63 disposed within the guide 58 as shown in Fig. 7. A pin 64, on the side of the trip-rod adjacent to the rear end thereof, extends into a slot in the guide 58 and limits forward movement of the rod, while the spring 63 permits the rod to be pushed in rearwardly to the position shown by dotted lines in Fig. 7, at which it may be retained by turning the rod to engage the pin 64 in a notch 65 formed at one side of the slot. The direction of rotation of the control-shaft 48 is clockwise as viewed in Fig. 3, so that engagement of the cam-shoulder with the offset 52 pushes the arm 50 rearwardly, thereby moving the brake-lever 54 to press the brake-shoe 56 against the turntable. As the brake is applied, the resistance to the movement of the stop-cam reduces the driving force of the motor, available for actuating the turntable, so that movement of the turntable may be stopped very quickly by the engagement of the cam-shoulder with the stop-arm offset 52. The conical head 61 on the rear end of the trip-rod is positioned adjacent to the front end of the arm 50, so that by rearward movement of said conical head it engages and lifts the arm 50 to disengage the offset 52 from the cam-shoulder, thereby releasing the brake and allowing the motor to drive the turntable. If the trip-pin be immediately released, to return to its normal forward position, rotation of the turntable will be again stopped when the control-cam has made a complete revolution, but if a longer period of operation is desired, the trip-rod is turned to engage the pin 64 in the notch 65, whereby the head 61 is caused to retain the arm 50 in a raised or release position which permits continued rotation of the cam.

The plate 57 carries also, parallel with the guide 58, a guide 66 for the front portion of the governor-rod 67. The front end of said rod, which projects through the guide and plate, is threaded and carries a nut 68 by which longitudinal adjustments of the rod may be effected. The rear end of the governor-rod is connected pivotally with the lower arm of a lever 69 carried by a shaft 70 mounted pivotally in the frame 30, said lever 69 having a second arm which extends above the governor-friction-plate 36 in position to be engaged thereby at predetermined speeds of the turntable.

At the upper side of the motor-frame 30 a notched head 71 is carried by a vertical shaft which is connected by suitable gearing (not shown) with the main-shaft of the motor, for use in winding the motor-spring. In a frame-member 72, carried at one end of the intermediate casing-section 21, a vertical shaft 73 is held slidably and rotatably, said shaft having connected therewith at its upper end a crank 74 and having at its lower end a notched head 75 adapted to intermesh with the head 71. A spring 76 normally holds the shaft 73 in a raised position at which the heads 71 and 75 are disengaged as shown in Fig. 3, and allows said shaft to be pushed down to cause engagement of the notched heads, after which the motor-spring may be wound by turning of the crank 74.

The intermediate casing-section 21 has a top or cover-plate 77, which is removed in Figs. 2, 3, 4, 5, 6, 8, 10 and 12, and is shown in Figs. 1, 16 and 17. At one end, adjoining the front of the casing, the plate 77 has a rectangular opening therein, through which is exposed a screen or grid 78 covering the mouth of an amplifying horn 79, the latter being fixedly secured in the intermediate casing-section 21 and extending from the screened mouth downwardly and rearwardly along the end of the casing, thence longitudinally adjoining the rear side of the casing, and having a U-bend 80 at the end of the longitudinal portion, as shown in Fig. 2. At the end of the inner portion of the U-bend 80 is a swivel-joint 81 for connecting the horn with a tapering tubular tone-arm 82 which extends forwardly therefrom, and at the front end of the arm is an elbow 83 extending downwardly and laterally from the horizontal portion. A tube 84 of flexible material connects the end of the elbow 83 with a swivel-joint 85 which is maintained in connection with the sound-box or reproducer 86 by a small tension spring 87. The reproducer has the usual stylus-lever 88 which carries a removable stylus 89 for engagement with a record-disk 90 carried upon the turntable 42.

The mechanism for supporting and controlling the sound reproducer is carried by the intermediate casing-section 21. Within said casing-section, at the front central portion thereof, is a frame-member 91, and in said frame-member and the end frame-member 72 are supported the end portions of a lead-screw 92, a rocking-shaft 93, and a guide-rod 94, which extend parallel with each other, longitudinally of the casing, the screw 92 being rearward of the rocking-shaft and substantially at the same level therewith, and the rod 94 being above and slightly rearward of the rocking-shaft. A pinion 95 on the lead-screw meshes normally with an intermediate gear 96 mounted on the motor-frame 30, and said gear 96 is driven by the gear 47 on the control-shaft 48. On the rocking-shaft is secured a pair of forwardly extending arms 97, one of which is adjacent to the frame-member 91 and the other spaced from the frame-member 72, and in the front ends of said arms are secured the ends of a rod 98 which is parallel with the rocking-shaft. One end of the rocking-shaft projects through the frame 72 and has a flat spring 99 secured to and extending rearwardly therefrom, the rear end of said spring engaging a lug 100 on the casing, whereby the shaft is held yieldingly in a normal position at which the arms 97 are substantially horizontal. On the portion of the rocking-shaft intermediate the arms 97 there is slidably mounted a sleeve 101 having at one end thereof a head portion 102. Mounted on said head portion 102 and extending forwardly therefrom are a pair of concave rollers 103 which straddle the rod 98 and have a rolling contact therewith, whereby to allow free movement of the sleeve 101 longitudinally of the rocking-shaft, while preventing rotation of said sleeve relative to said shaft. A collar 104 is mounted on the cylindrical intermediate portion of the sleeve 101, as best shown in Fig. 15, said collar being movable pivotally about the axis of the sleeve and shaft, and its pivotal movement being controlled by a coil spring 105 disposed about the sleeve. One end of said spring 105 is connected with the collar 104 and the other is connected with a loose ring 106 having a toothed face adjoining a similarly toothed face of a ring 107 secured to the sleeve 101 at the end thereof. The longitudinal pressure of the spring 105 holds the toothed faces of the loose ring 106 and fixed ring 107 in engagement with each other, to normally prevent rotation of said loose ring relative to the sleeve 101, and to thus maintain an adjusted torsion of the spring 105 to be exerted upon the movable collar 104. At the upper side of said collar 104 is a forwardly extended portion which has a flat upper face to which a bar 108 is connected pivotally by means of a vertically extending screw 109, said bar extending rearwardly from the collar and being approximately horizontal, as best shown in Fig. 5. A pair of arms 110 are formed integrally with the bar 108 and extend laterally thereof near its pivoted end. At the end of each arm 110 is a roller 111 mounted to revolve about a vertical axis and adapted for rolling engagement with the guide-rod 94. The rearward portion of the bar 108 is channeled at its upper side to receive the rectangular stem portion of an annular holder 112 which is clamped about the sound-box or reproducer 68 by means of a screw 113, said rectangular stem being detachably secured in the channeled bar by means of a screw 114. To the end of the head portion 102 of the sleeve 101 is secured a flat arm 115, disposed vertically edgewise, said arm extending rearwardly past the holder 112, and at its rear end having a transverse finger 116 which extends beneath a pin 117 projecting from the rear side of the holder. The sleeve 101 and the parts mounted thereon constitute the reproducer-carriage, which is movable longitudinally of the rocking-shaft 93, and which is constrained by the rod 98 and rollers 103 to partake of any rocking or tilting movement of said shaft about its axis. The arrangement of the parts is such that in the position of the rocking-shaft at which the same is normally maintained by the spring 99, the arm 115 is substantially horizontal, the pin 117 rests upon the transverse finger 116, and the holder 112 is thereby supported in a raised position at which the reproducer-stylus 89 is disengaged from the record-disk 90 on the turntable. In said raised position of the holder 112, the rollers 111 on the lateral arms 110 of the holder-bar 108 are pressed against the guide-rod 94, thus inhibiting lateral or pivotal movement of said holder-bar about the pivot-screw 109, and serving to center or retain the holder-bar in a position substantially at right angles to the rocking-shaft. By tilting of the rocking-shaft and carriage to move the finger 116 downwardly, the holder 112 and the reproducer are lowered to a position at which the stylus 89 will engage the record-disk, so that the same will then support the reproducer in operative or reproducing position, and a slight further tilting of the rocking-shaft will disengage the finger 116 from the pin 117. By the same tilting movement of the carriage, the rollers 111 are disengaged from the guide-rod 94, so that the bar 108 is free to swing laterally about the pivot-screw 109, thus permitting a limited movement of the stylus 89 in a direction substantially radial of the record-disk, or transversely of the sound-groove therein, whereby the stylus may follow said groove during a plurality of revolutions of the turntable and record. In said operative or reproducing position the pressure of the stylus upon the record is controlled by the spring 105, which may be so adjusted as to cause a downward pressure if the weight of the reproducer and its holder is insufficient to cause the desired stylus-pressure, or if the weight of the parts is such as to cause an excessive stylus-pressure said spring 105 may be adjusted to cause a lifting or partial counterbalancing of the weight. Slight variations in the level of the surface of the record-disk are accommodated by pivotal movement of the holder-collar 104 about the sleeve 101, and any eccentricity of the record-groove is accommodated by lateral swing of the holder about the axis of the pivot-screw 109.

Tilting or rocking movement of the shaft 93, to cause lowering of the reproducer to operative relation with the record-disk, is effected and controlled as follows: On the frame-member 72, at a point intermediate the rocking-shaft 93 and lead-screw 92, is pivotally connected the lower end of the control-lever 118, which extends up through a slotted plate 119 secured on the cover-plate 77 of the casing-section 21, the upper end of said control-lever having a handle or knob 120 thereon for convenience in grasping and moving the same. A clutch-plate 121, mounted loosely on the rocking-shaft 93 adjacent to the frame-member 72, has an upwardly extending arm 122 which is connected with the control-lever 118 by a link 123 having its ends pivotally attached to said arm and lever, so that by means of said lever the clutch-plate is movable about the shaft from the position shown in Fig. 8 to the position shown in Fig. 12. Adjacent to the clutch-plate 121 a clutch-sleeve 124 is mounted slidably on the rocking-shaft, said sleeve having a longitudinal slot into which a pin 125 extends from the side of the shaft, as shown in Fig. 11, whereby to prevent relative rotation of the sleeve and shaft, while permitting a limited longitudinal movement of the sleeve. The sleeve 124 is pressed yieldingly toward the clutch-plate 121 by means of a spring 126 disposed around the sleeve and engaging a washer 127 on the shaft adjoining the hub of the arm 97. From the end of the sleeve adjoining the clutch-plate, an arm 128 is extended downwardly, and at the lower end of said arm is carried a roller 129 which is engageable selectively with cams 130 and 131 carried by the control-shaft 48. On the side of the clutch-plate 121 and the adjacent end of the sleeve 124 are lugs 132 and 133, having contacting faces which are helically inclined about the shaft-axis and which are held in contact with each other by the pressure of the spring 126. Also projecting from the plate 121 and the adjacent end of the sleeve 124 are lugs 134 and 135 of which the adjacent edges are parallel with the shaft-axis. When the control-lever 118 is placed in the extreme forward position shown in Fig. 8, the lugs 132 and 134 on the clutch-plate are related to the lugs 133 and 135 on the clutch-sleeve as shown in Fig. 9, and the spring 126 is enabled to move the sleeve toward the clutch-plate, whereby the roller 129 is placed in operative relation to the cam 130. By movement of the control-lever to the intermediate position shown in Fig. 10, the clutch-plate is so rotated that the contacting helical faces of the lugs 132 and 133 are caused to push the sleeve away from the plate, whereby to shift the position of the arm 128 and place the roller 129 in operative relation to the cam 131, as shown in Fig. 11. By a further rearward movement of the control-lever, to the position shown in Fig. 12, the axial edges of the lugs 134 and 135 are engaged and the pivotal or rocking movement of the clutch-plate 121 is thereby communicated to the sleeve 124, whereby to cause a like rocking movement of the shaft 93 and arm 128, the latter causing the roller to be withdrawn from operative relation to the cams 130 and 131, as shown in Fig. 12. For retaining the control-lever 118 in the adjusted positions shown respectively in Figs. 8, 10 and 12, notches 136, 137 and 138 are formed in the side of the slot in the plate 119, the lever being normally engaged on one of said notches, and being displaced therefrom by a slight side pressure when it is desired to change the adjustment by movement of the lever along the slot to position for engagement with another of the notches.

The cams 130 and 131 on the control-shaft 48 have low portions 130ª and 131ª which are in axial register with each other, and the cam 130 has an additional short low portion 130ᵇ positioned intermediate the ends of the raised or lifting portion of its periphery. When the control-shaft is in the normal position at which motion of the motor-driven parts is stopped by engagement of the stop-cam 49 with the stop-arm 50, as before described, the low portions 130ª and 131ª of the cams are so positioned as to be engageable by the roller 129, and while said roller is engaged with a low portion of either cam, the rocking-shaft maintains the reproducer in the raised position at which the stylus 89 is disengaged from the record-disk 90, as shown in Fig. 8. When the control-shaft is rotated to engage the raised or lifting portion of one of the cams with the roller 129, the lower end of the arm 128 is pushed forwardly, the rocking-shaft is thereby turned or rocked sufficiently to lower the reproducer and place the stylus in operative relation to the record-disk, as shown in Fig. 10, and said operative relation is maintained until the rotation of the control-shaft again brings a low portion of the cam into position for engagement by the roller 129. The lifting-arm 115 of the reproducer-carriage has in the intermediate portion thereof an arcuate slot 139 through which the lead-screw 92 passes, the extent of said slot being sufficient to allow the tilting movements of the carriage to be made without contact of said arm with the screw. On one side of said arm, adjoining the upper portion of said slot 139, is fixedly attached a guide 140 in which is held slidably a half-nut or rectangular block 141 having at the lower side thereof segmental threads adapted for operative engagement with the lead-screw. A spring 142, arranged beneath the partly closed top of the guide, presses the block yieldingly downward, and its downward movement is limited by the head 143 of a stem which extends from the block through a slot in the top of the guide. When the control-lever 118 is placed in the extreme rearward position, and the rocking-shaft and the parts carried thereon are thereby positioned as shown in Fig. 12, the half-nut 141 is brought into operative engagement with the lead-screw, which then actuates the carriage longitudinally of the rocking-shaft at a rate proportional to the rate of rotation of the turntable, so that the reproducer is maintained in register with the successive portions of the sound-groove for continuous reproduction of the entire record.

When selected portions of the record are to be reproduced, the reproducer carriage is shifted along the rocking-shaft by manually controlled means, to place the stylus at the starting point of the desired portion or division of the record. The selector mechanism is connected with the carriage through the medium of a horizontal latch-plate 144 carried at the end of an arm 145 extended up from the head 102 of the carriage-sleeve 101. The front edge of the latch-plate 144 has a central rectangular notch therein, and is slightly inclined rearwardly from the sides of the notch toward each end of the plate, as best shown in Fig. 2. On the inside of the front of the casing-section 21 a rack-bar 146 is mounted slidably in suitable guides 147, said bar having a plain portion extending to the left of the toothed portion as shown in Fig. 2. Upon the inner side of the plain part of the rack-bar 146 is secured a bracket 148 in which is pivotally held a latch-piece 149 adapted for engagement in the central notch of the latch-plate 144, to connect the rack-bar and the reproducer-carriage for coincident longitudinal movement. The latch-piece comprises a rectangular member fitting in a vertical groove in the rear side of the bracket 148 and pivoted thereto at its lower end, as best shown in Figs. 10 and 12, whereby the upper end of the pivoted member is swingable rearwardly to engage in the central notch of the latch-plate. The engagement of the member 149 with the plate 144 occurs only when the reproducer is in the raised position shown in Fig. 8, and when the rocking-shaft and carriage are tilted to lower the reproducer into operative engagement with the record, as shown in Figs. 10 and 12, the latch-plate swings rearwardly out of engagement with the latch-piece. The toothed portion of the rack-bar 146 is operatively engaged by an intermediate gear 150 mounted on the frame-member 91, and said gear 150 is actuated by a gear 151 secured on the lower end of a short vertical shaft 152 mounted revolubly in the frame-member 91 and extending through the cover-plate 77 of the casing-section 21 as best shown in Fig. 16. Resting upon the plate 77 and fitting movably about the shaft 152 is a circular plate 153 having therein a row of holes 154 uniformly spaced apart and equidistant radially from the center of the shaft 152. At the rear edge of the plate 153 an integral rectangular portion 155 is extended outwardly from the main circular portion, and the end of said extended portion 155 is slotted or forked to straddle and receive slidably therein the lower portion of a cylindrical block 156 (see Figs. 17 and 16). The flat lower end-face of said block 156 rests upon the plate 77, and the parallel upper end-face engages slidably the horizontal upper portion of a bridge-plate 157 having its vertical end portions secured to the plate 77. The block 156 has a transverse threaded opening in which is received the adjusting-screw 158, the end portions of said screw being held rotatably in the vertical end portions of the bridge-plate 157. By turning the screw 158 the block 156 is moved longitudinally thereof, and its motion is transmitted to the forked extension 155 of the plate 153, to effect adjustments of said plate about the axis of the shaft 152. To the upper end of said shaft 152 is secured the selector-disk 159, which carries near one edge thereof a knob or handle 160, for use in turning the disk. The lower end of the handle 160 has a vertical cylindrical opening therein, in which is disposed a ball 161, the same being pressed downwardly by a coil spring 162 arranged in the opening above the ball, as shown in Fig. 16. The ball 161 is normally engaged in one of the holes 154 in the adjusting-plate 153, and thereby forms a frictional stop for retaining said plate and the disk in adjusted relations to each other. Around the edge of the selector-disk 159 are numbered graduation-marks 163 which may be severally placed in register with a gage-mark on a plate 164 carried on the extension 155 of the adjusting-plate, the arrangement being such that as each of the marks 163 is in register with the gage-mark the ball 161 will rest in one of the holes 154. Rotation of the selector-plate actuates the shaft 152 and the gears 151 and 150, and the latter moves the rack-bar 146 longitudinally an amount corresponding to the amount of movement of the selector-disk. Thus, when the reproducer-carriage is connected with the rack-bar, through the medium of the latch-plate 144 and latch-piece 149, the reproducer may be accurately positioned in accordance with the indication afforded by the graduations 163 on the selector-disk. If, by reason of variations in the record-disks, the stylus does not register accurately with the starting-points of a record when the marks 163 on the selector-disk are in gaged position, a micrometric re-adjustment may be effected by turning the screw 158, to thereby vary the position of the plate 153, and effect a corresponding variation in the positions of the selector-disk and the parts controlled thereby.

The top or cover-section 22 of the casing is shown as provided with a pocket or holder 166 for holding the record-disks not in use, and when the cover-section is opened as shown in Fig. 1, there is formed a convenient support for a short or lesson-sheet 167, which is divided into a plurality of spaces 168 numbered to correspond with the numbered graduations of the selector-disk 159. The several spaces or divisions of the chart are employed for showing subject matter familiar to the student and relating to unfamiliar subject matter on the corresponding sound-record, which may be reproduced selectively by setting the selector-disk so that the gage 164 is in register with the graduation on said disk having the same index-number as that section of the chart which shows the familiar form of the subject matter which it is desired to reproduce. The sound-records provided for use with the selective reproducing mechanism, are formed as usual with a continuous spiral sound-groove in which the stylus is engaged during operation of the reproducer, but the sound-groove is left blank or uninscribed at uniform intervals, to afford places at which the stylus may be placed for starting reproduction of the respective sound-inscribed portions of the groove. Referring to Fig. 18, in the portion of the record shown, there are three sections or divisions A, B and C, each containing twelve turns or convolutions of the sound-groove. In the section A there are represented two blank or uninscribed turns of the groove at the outer or starting portion of the section, then nine turns of the groove which are undulating or sound-inscribed, and finally one turn of the groove which is blank. In each of the sections B and C there are represented two blank turns at the start, then four inscribed turns b and c, then two blank turns, then four inscribed turns b' and c', and finally one blank turn. The inscribed groove-turns b—c and b'—c' comprise sub-sections of the main or normal sections B and C, each of said sub-sections, together with its blank or starting turns, being substantially half of the main or normal section.

The operation of the mechanism as a whole may now be easily understood. Assume, for example, that the mechanism is to be used for study of a foreign language. In such case the sound-records employed contain words, phrases and sentences spoken in that language, preferably by a person to whom said language is his native tongue. The ordinary standard commercial sound-records of a size approximately ten inches in diameter and having ninety-six turns of the sound-groove per inch, provide amply for division of the recording-space into twenty-four sections, such as the section A represented in Fig. 18, each containing twelve turns of the sound-groove. Allowing three blank turns of the groove in each section, the remaining nine turns require for normal reproduction approximately six and one-half seconds, and this time is sufficient for the speaking of a sentence containing ten to fifteen words. For shorter sentences and phrases, the record is divided into shorter portions, such as the sub-sections b—b' and c—c' represented in Fig. 18, each of said short or sub-sections including two or more blank turns of the sound-groove in addition to the inscribed turns thereof. A record-disk of the described character is placed upon the turntable 42, which is made accessible for the insertion or removal of a record-disk by lifting the front portion of the intermediate casing-section 21, the same tilting about the axis of the hinge 23. When the casing is thus opened for removal or replacement of a record-disk upon the turntable, the lead-screw pinion 95 is temporarily disengaged from the intermediate gear 96, and the cam-roller 129 is temporarily raised out of proximity to the cams 130 and 131, but the operative relation of said parts is resumed when the casing is again closed. For each record-disk there is provided a corresponding chart or lesson-sheet, having printed in the numbered spaces or divisions thereof sentences, phrases or words in the language known to the student, and agreeing respectively with the foreign-language subject matter in the several sections or sub-sections of the record. In each space or division of the chart there may also be printed a translation into the foreign language of the subject matter in the known or familiar language in the same space, the translation being identical with the speech-record, so that upon reproduction of the latter the student may simultaneously hear the sounds and observe the printed form of the translated subject matter. The selector-disk 159 is turned by the student to place in registered with the gage-mark on the plate 164 the graduation-mark 163 having the same index-number as the space of the lesson-sheet or chart containing the subject matter desired to be reproduced. The reproducer being in the normal raised position, and being connected with the rack-bar 146 by the latch-piece 149 and latch-plate 144, turning of the selector-disk will so shift the reproducer-carriage that the stylus is disposed above the starting-turns of the desired section of the record. When a full section of the record, such as the section A in Fig. 18, is to be reproduced, the control-lever 118 is placed in the intermediate position at which it is engaged in the notch 137, and the arm 128 is thus positioned to place the roller 129 in engagement with the cam 131. The trip-rod 59 is then pushed in to engage and lift the stop-arm 50 and release the stop-cam 49, whereupon the motor actuates and causes rotation of the turntable and of the control-shaft 48. At the beginning of rotation of the control-cam 131, the roller 129 remains in contact with the low portion 131$^a$, and the reproducer consequently remains in raised position, for a sufficient time to enable the turntable to attain the normal speed required for reproduction. As the raised or lifting portion of the cam engages said roller 129, the reproducer is lowered to operative relation with the record, and continues in such relation until near the end of the period required for one revolution of the control-shaft 48, when the low portion of the cam again comes into position to allow the lifting of the reproducer, and immediately thereafter the shoulder of the stop-cam engages the offset 52 of the stop-arm to apply the brake and stop movement of the turntable.

It should be noted that during reproduction of a selected section of the record, the reproducer-carriage remains stationary or in fixed longitudinal relation to the rocking-shaft, and the limited movement of the reproducer transversely of the sound-groove, necessary to maintain the stylus in register therewith, is permitted by lateral swinging of the carrier-bar 108 about the axis of the pivot-screw 109. As the latch-plate 144 is swung out of engagement with the latch-piece 149 during the reproducing operation, or when the reproducer is in lowered position, the carriage is disconnected from the selector mechanism, and any turning of the selector-disk will merely result in placing the latch-piece out of register with the notch in the latch-plate instead of moving the reproducer transversely of the record-groove, which would cause the stylus to injure the record. Should relative displacement of the selector-disk and carriage occur, however, the operative connection between them may be restored, after the reproducer is in normal raised position, by turning the selector-disk to move the latch-piece past the latch-plate, during which the latch-piece will first engage the inclined edge of the plate and finally enter the notch upon coming into register therewith. At the conclusion of the reproducton of a selected section of the record, when the reproducer is lifted to its normal raised position, engagement of the rollers 111 with the guide-rod 94 causes the carrier-bar 108 to swing to its centered position from which it was moved during the reproduction, so that if the reproducer should be again lowered without changing the position of the carriage on the rocking-shaft, the stylus will enter the same turn of the sound-groove as in the previous operation, and reproduction of the same section of the record will be repeated. Thus a repetition of the reproduction of any selected section of the record may be effected by again pushing in the trip-rod 59 to raise the stop-arm 50 and release the stop-cam. If continued repetition of the same section of the record is desired, the trip-rod may be turned to engage the pin 64 in the notch 65, and the stop-arm 50 thereby retained in release position for any desired period.

For the reproduction of short portions or sub-sections of the sound-record, such as the sub-sections b—b' and c—c', the control-lever is placed in the forward position, at which it is engaged in the notch 136, and the cam-roller 129 is thereby disposed in operative relation to the cam 130. For the selection of sub-sections such as b and c, which are at the beginning of main sections B and C, the selector-disk is disposed in the same positions as if the entire sections B or C were to be reproduced, but for the selection of sub-sections such as b' and c', which are at the end portions of the main sections, the selector-disk is placed at intermediate positions, in which graduation-marks 165, intermediate the index-numbered graduations 163, are in register with the gage-mark on the plate 164. When controlled by the cam 130, the reproducer is lifted momentarily as the low portion 130$^b$ of the cam passes the roller 129, and during said lifting movement the rollers 111 engage the guide-rod 94 to reset the reproducer to the initial or starting position, so that reproduction of the same sub-section of the record will be automatically repeated during the concluding part of a single revolution of the control-shaft. The entire operation effected during one revolution of the control-shaft may be repeated, as before, by pushing in the trip-rod to release the stop-cam, and continued repetition may be caused by engaging the pin 64 in the notch 65 to hold the stop-arm 50 in release position.

When the entire subject matter upon a record is to be reproduced continuously, the control-lever is first placed in either the forward or intermediate position, being engaged respectively in the notches 136 or 137, and the cam-roller 129 being engaged with the low portion 130$^a$ or 131$^a$ of the respective cams, so that the reproducer is held in its raised position at which the latch-plate 144 is engageable by the latch-piece 149. The selector-disk is then turned to actuate the rack-bar 146 until the latch-piece is engaged with the notch in the plate 144 to operatively connect the rack-bar and carriage, after which the selector-disk is turned to place the reproducer at the starting-point of the record, such position usually being that at which the index-number 1 on the selector-disk is in register with the gage-mark on the plate 164. The trip-rod is then pushed in to position for releasing the stop-cam, and retained in such position by turning the pin 64 into the notch 65. Actuation of the turntable and control-shaft is thus started while the reproducer is temporarily under control of the cam 130 or 131, and as before, the reproducer is lowered to operative position after a sufficient time for the turntable to attain its normal speed. When the sound-reproduction has commenced, the control-lever is moved to the rear position at which it is engaged in the notch 138. The rocking-shaft and reproducer-carriage are thereby tilted to the positions shown in Fig. 12, at which the half-nut 141 is engaged with the lead-screw, and thereafter the carriage is actuated longitudinally of the rocking-shaft at the rate required to maintain operative relation of the stylus and sound-groove throughout the reproduction of the entire record. As the reproducer approaches the end of the record, the control-lever is re-set to the forward or intermediate position at which the roller 129 is in operative relation with one of the cams 130—131, and the trip-rod is turned to release the pin 64 from the notch 65. Then, at the conclusion of the concurrent revolution of the control-shaft, the stop-cam will engage the offset 52 of the stop-arm to stop the motion of the turntable, and immediately prior thereto the reproducer will be lifted to its normal raised position. Since the carriage is shifted longitudinally of the rocking shaft during the continuous reproducing operation, upon the completion of the operation as above described, the carriage is in a position at which the latch-plate is out of register with the latch-piece. The operative relation of the carriage and selector-disk is re-established, however, by suitably turning the disk to actuate the rack-bar and move the latch-piece into register with the latch-plate-notch, as above mentioned.

In Fig. 19, I have shown a modification of the selector mechanism, wherein the rack-bar 146' is actuated by rotation of a pinion 150' which is fixedly connected with a belt-wheel 170 rotatably mounted beneath the cover-plate 77'. An endless belt 171 passes about the wheel 170 and about an idler-wheel 172 mounted beneath the rear portion of the plate 77', and in said plate above one side of said belt is a slot 173 of which the length is substantially equal to the distance between the centers of the belt-wheels. Secured to said belt 171 and extending up through said slot is a knob or handle 160' which may be moved longitudinally of the slot to actuate the belt and the wheel 170. Pointers 174 are secured to said handle and extend over the plate 77' adjacent to the slot, whereby the same may be placed in register with index-numbered divisions or spaces on charts 167' disposed upon the plate 77' and removably retained thereon by channel-strips 175 engaging the front and rear end-portions of said charts. The selecting operation is effected by moving the handle 160' longitudinally of the slot to place the pointers 174 in register with a division or space on the charts 167' containing the subject matter (or related subject matter, such as a translation) which is desired to be reproduced. By the use of two charts, arranged at opposite sides of the slot, one of the charts may contain known subject matter, and the other the unfamiliar subject matter corresponding specifically with that upon the sound-record. Also, where the sound-record has the sound-groove inscribed in short portions or sub-sections, such as b—c, b'—c', one of the charts 167' may relate to the subject matter upon the sub-sections b—c, and the other chart relate to the sub-sections b'—c'.

Now, having described my invention, what I claim and desire to secure by Letters Patent is:

1. An educational apparatus comprising a sound-record and an indexed chart each having a plurality of divisions respectively containing related subject matter, means for actuating the sound-record, a sound-reproducer adapted for coaction with said record, a support for said reproducer movable to dispose the latter in proximity to the several divisions of the record and to operatively engage the reproducer with the record and disengage the same therefrom, an indexed selector and gage relatively movable to adjusted positions corresponding with the several divisions of the chart, and means for connecting said selector with the reproducer-support whereby the reproducer is movable into proximity with a division of the record containing the subject matter related to that in the selected division of the chart, said connecting means being engageable with the reproducer-support when the latter is in position for holding the reproducer out of engagement with the record, and said connecting means being disengaged from said support by movement of the latter to engage the reproducer with the record.

2. In a mechanism of the class described, a sound-record, actuating means therefor, a control-shaft connected with said actuating means and having a fixed ratio of movement relative to the sound-record, a sound-reproducer, a carrier therefor, manually controlled means for shifting said carrier to place the reproducer in proximity to selected portions of the record, and means carried by said control-shaft and connected with said carrier for controlling movement of the reproducer into and out of operative relation with the record, said manually controlled shifting means being engageable with said carrier when the reproducer is out of operative relation with the record, and said shifting means being disengaged from the carrier by movement of the latter to place the reproducer and record in operative relation.

3. In a mechanism of the class described, a sound-record, actuating means for rotating the same, a sound-reproducer adapted for coaction with said record, a carriage on which said reproducer is mounted, said carriage being shiftable to place the reproducer in proximity to selected portions of the record and being also movable to operatively engage the reproducer with the selected portions of the record and to withdraw the same therefrom, a plurality of control-members connected with and driven by the record-actuating means, an element connected with said carriage and actuatable by each of said control-members to effect movement of the reproducer to and from operative relation with the record, and means for selectively positioning said element for engagement and actuation by either of said control-members.

4. In a mechanism for reproducing selected portions of a sound-record, means for supporting and actuating the sound-record, a sound-reproducer adapted for coaction with the record, a tiltable support, a carriage mounted for shifting movement along said support, an arm carrying said reproducer and pivotally connected with said carriage to enable lateral swing of the reproducer when the same is operatively engaged with the record, manually controlled means for shifting said carriage upon said support to place the reproducer in proximity to selected portions of the record, means for tilting said support to operatively engage the reproducer with the record and to disengage the same therefrom, a plurality of control-cams connected with the record-actuating means and adapted to automatically actuate said tilting means to engage the reproducer with the record and to disengage the same therefrom after predetermined periods of operation, means for positioning said swinging arm in fixed relation to the carriage when the support is tilted to disengage the reproducer from the record, and means for disposing said tilting means in operative relation with said control-cams severally.

5. In a machine of the class described, the combination with a disk sound-record, and means for rotating the same in a horizontal plane; of a carriage mounted to tilt about a horizontal axis and movable longitudinally of said axis, a guide-rod extending parallel with said axis and spaced therefrom, an arm connected pivotally with said carriage to swing in a horizontal plane, members carried by said arm and normally engaging said guide-rod to prevent swinging of the arm, and a sound-reproducer carried by said arm and normally supported in proximity to said record, said reproducer being movable into operative engagement with the record by tilting movement of the carriage, and said tilting movement disengaging said members from said guide-rod to enable limited swinging movement of said arm and the reproducer.

6. In a mechanism of the class described, the combination with a sound-record, actuating means for rotating the same, and a sound-reproducer suitable for coaction with said record; of a control-shaft connected with said acuating means to rotate in time with the sound-record, a carriage on which said reproducer is mounted, a tiltable support on which said carriage is movable longitudinally to place the reproducer in proximity to the several portions of the sound-record, yielding means normally retaining said support in a position at which the reproducer is disengaged from the sound-record, a control-member movable to tilt said support to a position for engaging the reproducer with the record, control-cams secured on said control-shaft, and means for shifting said member to engage optionally either of said cams for control thereby.

7. A structure as set forth in claim 6, including a lead-screw connected with the record-actuating means and rotating in time therewith, a half-nut on the carriage engageable with said lead-screw by tilting of said support, and manually controlled means for tilting said support to engage said half-nut with the lead-screw and simultaneously to move said control-member out of engagement with said control-cams.

8. In a mechanism for reproducing selected portions of a sound-record, means for supporting and actuating the record, a sound-reproducer adapted for coaction with the record, a movable support for said reproducer, a manually actuated selector connected with said support for moving the same to dispose the reproducer in proximity to selected portions of the record, a gage-member arranged adjoining said selector and having a plurality of spaced recesses therein, means carried by the selector and yieldingly engageable with said recesses to frictionally retain the selector and gage-member in adjusted relations, means for holding the gage-member in fixed position, and means for adjusting said holding means to minutely vary the position of the gage-member and to correspondingly vary the normal adjusted positions of the selector.

9. In a mechanism of the class described, a rocking-shaft, a carriage mounted slidably on said shaft, a sound-reproducer mounted on said carriage and adapted to be moved from a normal raised position to a lowered operating position by rocking of said shaft, a latch-plate affixed to said carriage above said shaft and having a beveled and notched edge portion extending longitudinally of the shaft, a manually controlled element movable longitudinally of the shaft adjacent to said latch-plate, and a latch-piece pivoted on said element and adapted for engagement with said edge-portion of the latch-plate when the reproducer is in normal raised position, the latch-plate being displaced from the path of the latch-piece when the reproducer is in lowered operating position.

10. In mechanism for reproducing selected portions of a sound record, a sound reproducer adapted for co-action with the record, means for actuating the record, and means connected with said actuating means to operatively engage said reproducer with selected portions of the record and to withdraw the same therefrom.

ARTHUR L. RUNYAN.

CERTIFICATE OF CORRECTION.

Patent No. 1,930,286.            October 10, 1933.

ARTHUR L. RUNYAN.

It is hereby certified that the name of the assignee in the above numbered patent was erroneously described and specified as "Talk-A-Print, trust, and Arthur L. Runyan, trustee" whereas said name should have been described and specified as Talk-A-Print, trust, Arthur L. Runyan, trustee; in the grant, strike out present lines 13 and 14, and insert instead Arthur L. Runyan, as Trustee for Talk-A-Print, Trust, his successors or assigns; and that the said Letters Patent should be read with these corrections therein that the same may conform to the record of the case in the Patent Office.

Signed and sealed this 11th day of February, A. D. 1936.

Leslie Frazer (Seal)                          Acting Commissioner of Patents.

means for shifting said carriage upon said support to place the reproducer in proximity to selected portions of the record, means for tilting said support to operatively engage the reproducer with the record and to disengage the same therefrom, a plurality of control-cams connected with the record-actuating means and adapted to automatically actuate said tilting means to engage the reproducer with the record and to disengage the same therefrom after predetermined periods of operation, means for positioning said swinging arm in fixed relation to the carriage when the support is tilted to disengage the reproducer from the record, and means for disposing said tilting means in operative relation with said control-cams severally.

5. In a machine of the class described, the combination with a disk sound-record, and means for rotating the same in a horizontal plane; of a carriage mounted to tilt about a horizontal axis and movable longitudinally of said axis, a guide-rod extending parallel with said axis and spaced therefrom, an arm connected pivotally with said carriage to swing in a horizontal plane, members carried by said arm and normally engaging said guide-rod to prevent swinging of the arm, and a sound-reproducer carried by said arm and normally supported in proximity to said record, said reproducer being movable into operative engagement with the record by tilting movement of the carriage, and said tilting movement disengaging said members from said guide-rod to enable limited swinging movement of said arm and the reproducer.

6. In a mechanism of the class described, the combination with a sound-record, actuating means for rotating the same, and a sound-reproducer suitable for coaction with said record; of a control-shaft connected with said acuating means to rotate in time with the sound-record, a carriage on which said reproducer is mounted, a tiltable support on which said carriage is movable longitudinally to place the reproducer in proximity to the several portions of the sound-record, yielding means normally retaining said support in a position at which the reproducer is disengaged from the sound-record, a control-member movable to tilt said support to a position for engaging the reproducer with the record, control-cams secured on said control-shaft, and means for shifting said member to engage optionally either of said cams for control thereby.

7. A structure as set forth in claim 6, including a lead-screw connected with the record-actuating means and rotating in time therewith, a half-nut on the carriage engageable with said lead-screw by tilting of said support, and manually controlled means for tilting said support to engage said half-nut with the lead-screw and simultaneously to move said control-member out of engagement with said control-cams.

8. In a mechanism for reproducing selected portions of a sound-record, means for supporting and actuating the record, a sound-reproducer adapted for coaction with the record, a movable support for said reproducer, a manually actuated selector connected with said support for moving the same to dispose the reproducer in proximity to selected portions of the record, a gage-member arranged adjoining said selector and having a plurality of spaced recesses therein, means carried by the selector and yieldingly engageable with said recesses to frictionally retain the selector and gage-member in adjusted relations, means for holding the gage-member in fixed position, and means for adjusting said holding means to minutely vary the position of the gage-member and to correspondingly vary the normal adjusted positions of the selector.

9. In a mechanism of the class described, a rocking-shaft, a carriage mounted slidably on said shaft, a sound-reproducer mounted on said carriage and adapted to be moved from a normal raised position to a lowered operating position by rocking of said shaft, a latch-plate affixed to said carriage above said shaft and having a beveled and notched edge portion extending longitudinally of the shaft, a manually controlled element movable longitudinally of the shaft adjacent to said latch-plate, and a latch-piece pivoted on said element and adapted for engagement with said edge-portion of the latch-plate when the reproducer is in normal raised position, the latch-plate being displaced from the path of the latch-piece when the reproducer is in lowered operating position.

10. In mechanism for reproducing selected portions of a sound record, a sound reproducer adapted for co-action with the record, means for actuating the record, and means connected with said actuating means to operatively engage said reproducer with selected portions of the record and to withdraw the same therefrom.

ARTHUR L. RUNYAN.

CERTIFICATE OF CORRECTION.

Patent No. 1,930,286.   October 10, 1933.

ARTHUR L. RUNYAN.

It is hereby certified that the name of the assignee in the above numbered patent was erroneously described and specified as "Talk-A-Print, trust, and Arthur L. Runyan, trustee" whereas said name should have been described and specified as Talk-A-Print, trust, Arthur L. Runyan, trustee; in the grant, strike out present lines 13 and 14, and insert instead Arthur L. Runyan, as Trustee for Talk-A-Print, Trust, his successors or assigns; and that the said Letters Patent should be read with these corrections therein that the same may conform to the record of the case in the Patent Office.

Signed and sealed this 11th day of February, A. D. 1936.

Leslie Frazer (Seal)   Acting Commissioner of Patents.

CERTIFICATE OF CORRECTION.

Patent No. 1,930,286.                                                    October 10, 1933.

ARTHUR L. RUNYAN.

It is hereby certified that the name of the assignee in the above numbered patent was erroneously described and specified as "Talk-A-Print, trust, and Arthur L. Runyan, trustee" whereas said name should have been described and specified as Talk-A-Print, trust, Arthur L. Runyan, trustee; in the grant, strike out present lines 13 and 14, and insert instead Arthur L. Runyan, as Trustee for Talk-A-Print, Trust, his successors or assigns; and that the said Letters Patent should be read with these corrections therein that the same may conform to the record of the case in the Patent Office.

Signed and sealed this 11th day of February, A. D. 1936.

Leslie Frazer (Seal)                                Acting Commissioner of Patents.